United States Patent [19]

Bavaveas

[11] 4,213,871

[45] Jul. 22, 1980

[54] BIOLOGICAL ACTIVATORS

[75] Inventor: Tristan Bavaveas, Paris, France

[73] Assignee: Societe Anonyme dite:EPARCO, France

[21] Appl. No.: 813,231

[22] Filed: Jul. 6, 1977

[30] Foreign Application Priority Data

Jul. 6, 1976 [FR] France ................................ 76 20586

[51] Int. Cl.$^2$ ................................................ C09K 3/00
[52] U.S. Cl. ........................................ 252/60; 252/61; 252/259.5; 424/357; 106/71
[58] Field of Search ........................ 252/60, 61, 259.5; 424/357; 106/71

[56] References Cited

U.S. PATENT DOCUMENTS

| | | | |
|---|---|---|---|
| 1,440,356 | 12/1922 | Morrell | 252/312 UX |
| 2,207,911 | 7/1940 | Cannon | 106/71 |
| 3,371,134 | 2/1968 | Ollinger | 106/71 X |
| 4,118,236 | 10/1978 | Erskine | 106/71 |

OTHER PUBLICATIONS

Reference Book of Inorganic Chem, Latimer et al. p. 321, Table VI, 1951.

*Primary Examiner*—Mayer Weinblatt
*Attorney, Agent, or Firm*—Robert E. Burns; Emmanuel J. Lobato; Bruce J. Adams

[57] ABSTRACT

The invention relates to a biological activator for septic tanks. The biological activator is characterized by the fact it is in the form of a non-corrosive, non-toxic, finely-divided product having a significant specific surface constituting a base for the optional anaerobic microbic flora, permitting an increase in the density of bacterial saturation in the septic tank for an equivalent quantity of nutriment.

7 Claims, No Drawings

BIOLOGICAL ACTIVATORS

BACKGROUND OF THE INVENTION

The invention relates to a biological activator for septic tanks.

It is known that fecal materials are maintained in a septic tank during the time necessary for their liquefaction by biodegradation. This liquefaction is realized by the optional anaerobic microbic flora found in the fecal materials. During normal functioning, the microbic flora is sufficient to permit a satisfactory liquefaction of the fecal materials. This normal functioning can be disturbed by the weakening or, on the contrary, the excessive development of the microbic flora caused by the irregular use of the septic tank, the deposit in WC wash basins of the toxic products; acids, bleach, detergents, antibiotics, the ends of cigarettes, etc —, overloading due to the under-dimensioning of the septic tank for the number of users; and excessive formentations notably during periods of excessive heat.

These disruptions, in the liquefaction of fecal materials, result in bad odors due to partial or total blockage of the tank. Two solutions for terminating these disruptions are known at present. The first solution consists in providing, in the septic tank, a quantity of bacteria susceptable to liquifying, due to biodegradation, surplus fecal materials. However, this solution presents the major inconvenience of requiring very long use.

Another solution consists in introducing into the septic tank a product such as caustic soda, iron sulphate or a corrosive, an emollient capable of acting on the fecal material by substituting in some way deficient optional microbic anaerobic flora. This solution, however, presents a double inconvenience: in the first place, the product introduced into the septic tank can only prevent fresh disruptions as they arise. In the second place, the product introduced can be of a nature which is deleterious to the tank.

SUMMARY OF THE INVENTION

The object of the present invention is to remedy these inconveniences. To obtain this, the invention provides a biological activator characterized in that it is in the form of a non-corrosive and non-toxic product in finely-divided form and having a significant specific surface constituting a base for the optional anaerobic microbic flora which permits an increase in the density of baterial solution in the septic tank for an equivalent quantity of nutriment.

Example of the present invention will now be described.

The biological activator for the septic tank is preferably, but not exclusively constituted by a clay compound with known a physical chemical proportion.

The physical proportions of the biological activator for septic tanks prepared for use are the following:

The product is very finely divided. For example, a statistical study of granulometry shows that the major part of the particles of the product have a diameter less than 50 microns. One such granulation process ensures a good division of the product in the septic tank. The biological activator for septic tanks has a significant specific surface. For example, this specific surface generally, but not limitedly, comprises between 4,500 and 9000 cm$^2$/gr for a product with an actual density comprising between approximately 2 and 3.2, preferably in the region of 2.5.

In solution, the major part —of the order approximately of 75% of the product flacculates so that the other part of the product —approximately 25%—is presented in colloidal form. The function of these two forms of product in solution will be described below.

The biological activator for septic tanks, at least beyond a certain concentration in solution, increases the foaming effects of a detergent solution. Moreover, the biological activator increases the tensic —active properties of the detergents.

In conclusion, the biological activator is characterized essentially, in so far as its physical properties are concerned by a significant specific surface; a decomposable composition in solution, in a colloidal form and in a decantable form; and a strong active emulsifier.

The chemical properties of the biological activator for septic tanks according to the invention are as follows:

The biological activator is non-corrosive and non-toxic. In this way, it is not dangerous to use neither is it harmful to the septic tank.

The biological activator for septic tanks according to the present invention has a reduciny power of mineral orgin. The colloidal form of the biological activator for septic tanks according to the invention in solution has an absorbing power vis-à-vis notably volatile acids such that acetic acid, butyric acid and sulphuric acid of which the fetid odor is well known.

The chemical composition of biological activator for the septic tanks can be varied between widespread limits. In a non-limitary example, this product can be composed, of the major elements, of silica as $SiO_2$—between approximately 50 and 90%, of aluminum as $Al_2O_3$ between approximately 3 and 30% of iron as $Fe_2O_3$ between approximately 1 and 4% and of calcium as $CaCO_3$ between approximately 1 and 4%. The percentages are according to the dry weight of the product. Among other major elements which could be used in the composition of the biological activator according to the invention is magnesium. Among the trace elements that can be present which comprise the biological activator for septic tank according to the invention, may be mentioned without this list being exhaustive, bismuth, cesium, titanium, copper, lead, vanadium, boron, gallium, manganese, barium, cobalt, germanium, tin, zinc, beryllium, chromium and strontium.

In conclusion, the more significant chemical proportions of the activator are a non-corrosive and non-toxic nature with reducing and absorbing power.

The effects of the biological activator according to the invention placed in a septic tank are the following:

In the first place, the introduction of the biological activator into the septic tanks allows the formation of a selective reducing environment for microbic anaerobic flora. This is obtained without introducing into the septic tank nutritive biodegradable substrates which play, in the septic tank, vis-a-vis the anaerobic bacteria, the same element role as the fecal materials.

Once introduced into the septic tank the biological activator according to the invention is separated into a colloidal phase and a flocculant phase. The colloidal phase which floats on the surface emulsifies the fatty non-degradable bodies contained in the fecal material and absorbs the volatile acids which generate the fetid odors. The flocculant phase entrains floating materials to the bottom of the tank thus ensuring a good decantation.

This, the biological activator constitutes a base for the optional anaerobic microbic flora which permits a substantial increase in the quantity of the bacteria found at any given moment in the septic tank. In other words, the biological activator functions to increase the maximum density of bacterial solution for an equivalent amount of nutriment. This result can be obtained to a very important degree as a function of the concentration of the biological activator of the invention. In particular, it can be shown that the biological activator of the invention permits a triple multiplication of the density of bacterial saturation which results in a natural equilibrium in the septic tank.

What is claimed is:

1. A biological activator for septic tanks useful for increasing the bacteria therein consisting essentially of 50 to 90% silica in the form of $SiO_2$, 3 to 30% aluminum in the form of $Al_2O_3$ and 1 to 4% of iron in the form of $Fe_2O_3$ and 1 to 4% calcium in the form of $CaCO_3$ and at least one trace element selected from the group consisting of bismuth, cesium, titanium, copper, manganese, barium, cobalt, germanium, tin, zinc, beryllium, chromium and strontium, said activator being a non-corrosive mineral composition in finely divided form, non-toxic to bacteria, the majority of the particles of said composition having a particle size of less than about 50 microns and having a specific surface of about 4500 to 9000 $cm.^2/g.$ such as to provide a base for the anaerobic microbic flora thereby providing for an increase in the density of bacteria in the septic tank or an equivalent quantity of nutriment.

2. A biological activator according to claim 1, wherein said activator includes at least one trace element selected from the group consisting of bismuth, cesium, titanium, copper, magnanese, barium, cobalt germanium, tin, zinc, beryllium, chromium and strontium.

3. A biological activator according to claim 1 in which in solution approximately 75% of said clay flocculates and the remainder is present in colloidal form in which the colloidal phase floats to the surface and emulsifies fatty nondegradable bodies contained in said septic tank and absorbs volatile acids, and the flocculant phase entrains floating materials to the bottom of the tank.

4. A biological activator in accordance with claim 1 in which in solution approximately 75% of said mineral composition flocculates and the remainder is present in colloidal form, in which the colloidal phase acts as an emulsifier to emulsify fatty bodies in said septic tank.

5. A biological activator in accordance with claim 1 in which said mineral composition has an actual density of between approximately 2 and 3.2.

6. A biological activator according to claim 1, which, when in solution has a colloidal phase and a flocculant phase.

7. A biological activator according to claim 6, in which the colloidal phase absorbs fetid volatile acids.

* * * * *